Aug. 18, 1953  H. W. KITCHEN  2,648,922
ROTARY SCOOP AND GRADER
Filed Sept. 26, 1947  3 Sheets-Sheet 3
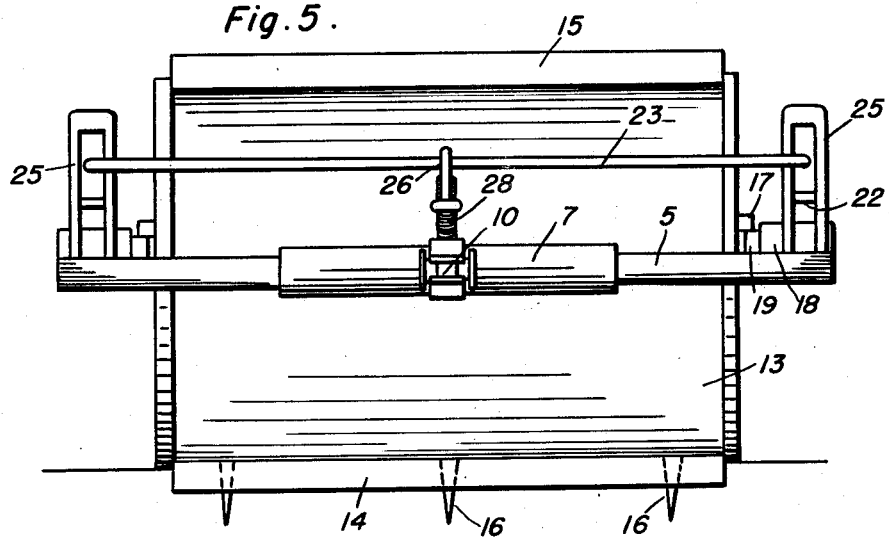
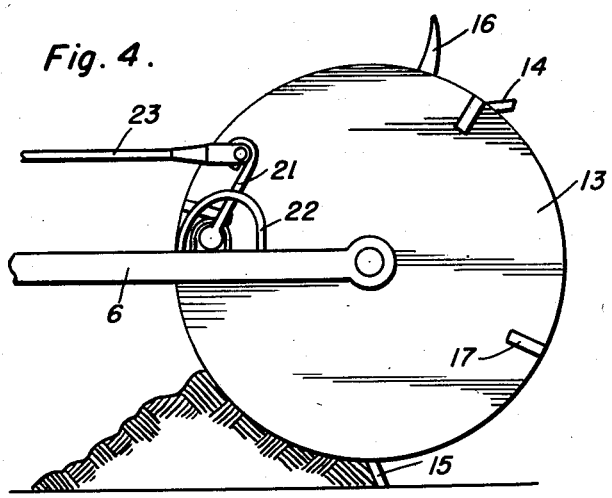
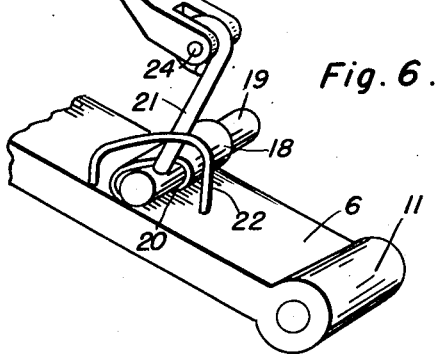
Inventor
Herman William Kitchen
By *Clarence A. O'Brien and Harvey B. Jacobson*
Attorneys Patented Aug. 18, 1953

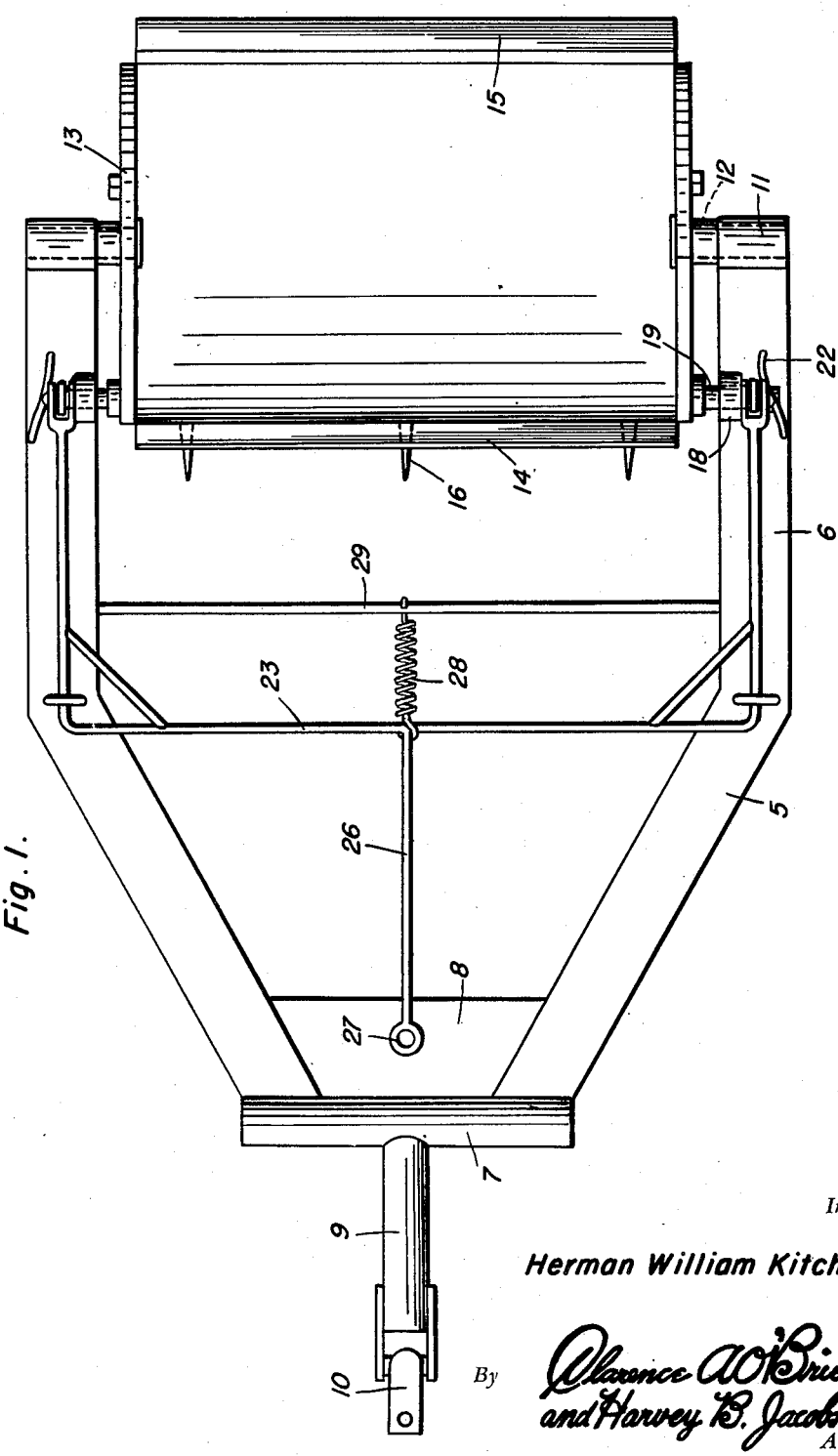

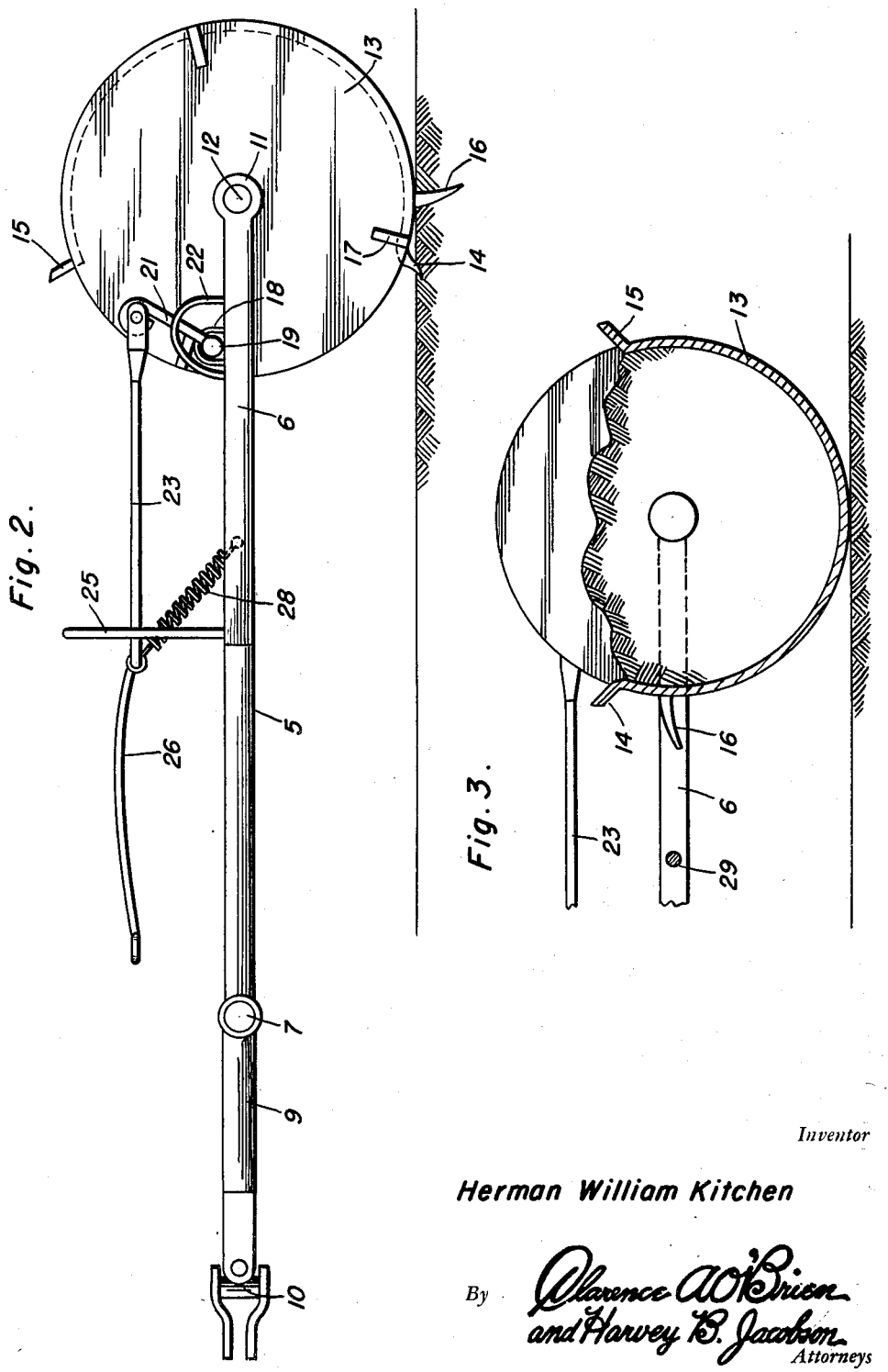

2,648,922

UNITED STATES PATENT OFFICE 2,648,922

ROTARY SCOOP AND GRADER

Herman William Kitchen, Leasburg, Mo.

Application September 26, 1947, Serial No. 776,257

1 Claim. (Cl. 37—140)

The present invention relates to new and useful improvements in earth working implements and more particularly to a rotary scoop and grader.

An important object of the present invention is to provide a device of this character wherein the rotary scoop is provided with scarifying teeth and blades on the periphery thereof together with control means for holding the teeth or blades in a lowermost position in contact with the ground whereby the teeth and blades may be selectively used for loosening the earth, for filling the scoop and for dumping and scraping the load to grade the surface.

A further object of the invention is to provide novel control means for the scoop to selectively hold the same in a desired position against rotation and including lugs at circumferentially spaced intervals at each end of the scoop and a manually controlled locking pin held in the path of the lugs to lock the scoop in a desired position.

A still further object is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a side elevational view showing the scoop in loading position.

Figure 3 is a transverse sectional view of the scoop showing the same in position for transporting the load.

Figure 4 is a side elevational view showing the scoop in grading position.

Figure 5 is a front elevational view, and

Figure 6 is an enlarged perspective view of the locking pin for the scoop.

Referring now to the drawings in detail, wherein for the purpose of illustration, I have disclosed a preferred embodiment of the invention, the numeral 5 designates a frame which includes a pair of spaced parallel arms 6 converging at their front ends and rigidly connected to each other at their converging ends by a cross member 7 and reinforcing web 8. A tongue 9 projects forwardly from the cross member 7 and is provided with a universal trailer hitch 10, by means of which the frame may be connected to a tractor or other towing vehicle.

The rear ends of the arm 6 are rolled to form bearings 11 in which trunnions 12 projecting outwardly at the ends of a semi-cylindrical scoop 13 are journaled for rotatably mounting the scoop in the frame.

The body of the scoop is open at one side and the edges of the body at its open side are formed with outwardly inclined blades 14 and 15. The body of the scoop, adjacent the blade 14, is also provided with a plurality of longitudinally spaced apart scarifying teeth 16 suitably secured to the outer surface of the scoop.

Each end of the scoop is provided with a plurality of circumferentially spaced lugs 17.

A sleeve 18 is suitably secured in a transverse position on the upper surface of each of the arms 6 and in which locking pins 19 are slidably and rotatably carried. The sleeves are formed with cutaway or bevelled outer end portions 20 and against which an upwardly extending arm 21 rides, the lower end of the arms being suitably secured to the outer ends of the pins 19. The arms 21 are held in close engagement with the cutaway end portions 20 by inverted U-shaped wire guides 22 secured to the arms 6 parallel to the cutaway end portions 20 whereby the arms 21 ride between the cutaway end portions 20 of the sleeves 18 and the guides 22.

A yoke 23 has its bifurcated ends pivotally attached to the upper ends of the arms 21 by pins 24, the parallel sides of the yoke extending forwardly above the arms 6 and freely positioned in inverted U-shaped guides 25 rising from the arms 6. A lever 26 extends forwardly from the central portion of the yoke and is provided with an eye 27 at its front end by means of which an operating rope or cable (not shown) may be attached. A coil spring 28 is connected at one end to the rear end of the lever 26 and extends rearwardly and is attached at its rear end to a cross rod 29 extending between the arms 6 to return the locking pins 19 to their locking position with the lugs 17.

In the operation of the device, the scoop is drawn forwardly, to the left, as shown in Figure 2. When the scoop is substantially filled, forward movement of the scoop is stopped and the lever 26 is then pulled forwardly to disengage the locking pins 19 from the lugs 17. The scoop is then rolled in a reverse direction by rearward movement of the towing vehicle (not shown).

After the scoop has been rolled into the position shown in Figure 3 the lever 26 is released to lock the pins 19 under a proper lug to hold the scoop in that position during a forward hauling movement. By again releasing pins 19 the load may be dumped by either a forward or rearward rolling movement of the scoop.

In order to level or grade the dumped load the scoop is rolled in a direction to lock the grading blade 15 in a lowered position, as shown in Figure 4 behind the dumped load and the scoop is then dragged forwardly.

Having described the invention, what is claimed as new is:

In a rotary scoop having end walls and circumferentially spaced stops on at least one of said end walls and a supporting frame for the scoop; the improvement of which comprises a manually operated slidable locking pin movable into and out of the path of said stops, a stationary sleeve mounted on the frame adjacent said one of said end walls and slidably and rotatably supporting the pin, said sleeve having a cutaway outer end portion, an arm fixed to and projecting radially outwardly from the pin for riding against the cutaway portion of the sleeve to selectively retract and retain the pin upon movement of the arm in one direction or the other, and an inverted U-shaped guide mounted on the frame over the sleeve and parallel to said cutaway portion and guiding and holding the arm in engagement with said cutaway portion.

HERMAN WILLIAM KITCHEN.

References Cited in the file of this patent

UNITED STATES PATENTS

| Number | Name | Date |
| --- | --- | --- |
| 901,470 | Rankins | Oct. 20, 1908 |
| 1,438,730 | Walker | Dec. 12, 1922 |
| 1,476,254 | Jacobsky | Dec. 4, 1923 |
| 1,697,988 | McNamara | Jan. 8, 1929 |
| 1,861,762 | Terhaar | June 7, 1932 |
| 2,035,074 | Kauffman | Mar. 24, 1936 |
| 2,301,166 | Barnwell | Nov. 3, 1942 |
| 2,441,744 | Barker | May 18, 1948 |